(12) United States Patent
Xu et al.

(10) Patent No.: US 10,764,981 B2
(45) Date of Patent: Sep. 1, 2020

(54) TUNABLE LED LIGHT ARRAY FOR HORTICULTURE

(71) Applicant: Rosstech, Inc., Bozeman, MT (US)

(72) Inventors: Li Xu, Saratoga, CA (US); Ron Cooper, Bozeman, MT (US); Joe Rosson, Bozeman, MT (US)

(73) Assignee: Rosstech, Inc

(*) Notice: Subject to any disclaimer, the term of this patent is extended or adjusted under 35 U.S.C. 154(b) by 0 days.

(21) Appl. No.: 16/517,588

(22) Filed: Jul. 20, 2019

(65) Prior Publication Data
US 2020/0053854 A1    Feb. 13, 2020

Related U.S. Application Data

(60) Provisional application No. 62/717,683, filed on Aug. 10, 2018.

(51) Int. Cl.
| | |
|---|---|
| *H05B 45/22* | (2020.01) |
| *F21V 8/00* | (2006.01) |
| *A01G 7/04* | (2006.01) |
| *H05B 45/50* | (2020.01) |
| *A01M 29/10* | (2011.01) |

(52) U.S. Cl.
CPC .............. *H05B 45/22* (2020.01); *A01G 7/045* (2013.01); *G02B 6/0053* (2013.01); *G02B 6/0068* (2013.01); *G02B 6/0073* (2013.01); *H05B 45/50* (2020.01); *A01M 29/10* (2013.01)

(58) Field of Classification Search
CPC .. G02B 6/0053; G02B 6/0068; G02B 6/0073; G02B 6/0096; G02B 6/005; G02B 6/0018; H05B 47/00; H05B 45/22; H05B 45/50; Y02P 60/146; F21K 9/62; F21Y 2115/10; A01M 29/10
See application file for complete search history.

(56) References Cited

U.S. PATENT DOCUMENTS

| | | | |
|---|---|---|---|
| 6,134,092 A | * | 10/2000 | Pelka ................... G02B 6/0023 361/31 |
| 8,302,346 B2 | | 11/2012 | Hunt |
| 8,549,787 B2 | | 10/2013 | Aikala |
| 8,656,636 B2 | | 2/2014 | Hunt |
| 8,738,160 B2 | | 5/2014 | Bucove |
| 8,847,514 B1 | | 9/2014 | Reynoso |

(Continued)

*Primary Examiner* — Haissa Philogene
(74) *Attorney, Agent, or Firm* — Antoinette M. Tease

(57) ABSTRACT

Disclosed are devices, methods, and techniques for providing photosynthetically active radiation (PAR) for plants, i.e. lighting. Devices including light emitting diodes (LEDs) are disclosed than can be used as lighting for plants grown indoors or outdoors. The disclosed LEDs significantly reduce power consumption for horticulture lighting, provide the wavelengths needed by plants to optimize growth, and provide growers with the ability to control PAR in order to optimize grow strategies. The disclosed LEDs provide the correct wavelengths of light (300-800 nanometers (nm)) for photosynthesis with a uniform intensity across the LED device thereby providing an even photon delivery to plant canopy and into the underlying leaves within the plant canopy. The intensity and mixture of wavelengths provided by the LED device can be controlled by adjusting the electrical power delivered to individual LEDs included in the LED device.

8 Claims, 17 Drawing Sheets

(56) References Cited

U.S. PATENT DOCUMENTS

| | | |
|---|---|---|
| 8,850,742 B2 | 10/2014 | Dube |
| 9,060,468 B2 | 6/2015 | Klase |
| 9,137,874 B2 | 9/2015 | Maxik |
| 9,456,556 B2 | 10/2016 | Aikala |
| 9,516,818 B2 | 12/2016 | Aikala |
| 9,726,332 B1* | 8/2017 | May ............... F21K 9/66 |
| 9,820,447 B2 | 11/2017 | Viliagate |
| 9,844,518 B2 | 12/2017 | Lowe |
| 9,854,749 B2 | 1/2018 | Klase |
| 9,857,068 B2 | 1/2018 | Nguyen |
| 9,883,635 B2 | 2/2018 | Aikala |
| 9,955,632 B1 | 5/2018 | Adams |
| 9,961,841 B2 | 5/2018 | Aikala |
| 9,985,920 B2 | 5/2018 | Crudete |
| 1,002,844 A1 | 7/2018 | Grajcar |
| 1,003,434 A1 | 7/2018 | Adams |
| 1,003,443 A1 | 7/2018 | Helen |
| 1,011,139 A1 | 10/2018 | Szeto |
| 1,015,919 A1 | 12/2018 | Vilgiate |
| 1,017,229 A1 | 1/2019 | Krijn |
| 1,021,289 A1 | 2/2019 | Grajcar |
| 1,024,459 A1 | 3/2019 | Grajcar |
| 1,033,478 A1 | 7/2019 | Aikala |
| 1,039,809 A1 | 9/2019 | Adams |
| 2006/0006820 A1* | 1/2006 | Roseman ............... A01G 7/045 315/312 |
| 2009/0288340 A1* | 11/2009 | Hess ............... A01G 9/26 47/58.1 LS |
| 2010/0115830 A1 | 5/2010 | Dube |
| 2010/0259190 A1 | 10/2010 | Aikala |
| 2010/0277078 A1 | 11/2010 | Morton |
| 2011/0125296 A1 | 5/2011 | Bucove |
| 2011/0179706 A1 | 7/2011 | Hunt |
| 2011/0209400 A1 | 9/2011 | Rooymans |
| 2012/0099305 A1 | 4/2012 | Bucove |
| 2012/0159845 A1 | 6/2012 | Alkala |
| 2012/0218750 A1 | 8/2012 | Klase |
| 2013/0040380 A1 | 2/2013 | Hunt |
| 2013/0139437 A1 | 6/2013 | Maxik |
| 2014/0115958 A1 | 5/2014 | Helene |
| 2014/0123555 A1 | 5/2014 | McCord |
| 2015/0128488 A1 | 5/2015 | Casper |
| 2015/0128490 A1 | 5/2015 | Aikala |
| 2015/0150195 A1 | 6/2015 | Grajcar |
| 2015/0181811 A1 | 7/2015 | Krijn |
| 2015/0216130 A1 | 8/2015 | Grajcar |
| 2015/0224302 A1 | 8/2015 | Gunderson |
| 2015/0230409 A1 | 8/2015 | Nicole |
| 2015/0305108 A1 | 10/2015 | Probasco |
| 2015/0305252 A1 | 10/2015 | Klase |
| 2015/0342126 A1 | 12/2015 | Aikala |
| 2015/0351325 A1 | 12/2015 | Shelor |
| 2016/0014974 A1 | 1/2016 | Grajcar |
| 2016/0088802 A1 | 3/2016 | Nicole |
| 2016/0184237 A1 | 6/2016 | Lowe |
| 2016/0205739 A1 | 7/2016 | Grajcar |
| 2016/0262313 A1 | 9/2016 | Szeto |
| 2016/0371830 A1 | 12/2016 | Barrasso |
| 2017/0006783 A1 | 1/2017 | Aikala |
| 2017/0009944 A1* | 1/2017 | Wheatley ............... F21V 9/45 |
| 2017/0013786 A1 | 1/2017 | Aikala |
| 2017/0035002 A1 | 2/2017 | Ellins |
| 2017/0035008 A1 | 2/2017 | Ellins |
| 2017/0086391 A1 | 3/2017 | Vilgiate |
| 2017/0188531 A1 | 7/2017 | Daniels |
| 2017/0192154 A1 | 7/2017 | Gilley |
| 2017/0241632 A1 | 8/2017 | Nguyen |
| 2017/0339839 A1 | 11/2017 | Carstensen |
| 2018/0007838 A1 | 1/2018 | McCord |
| 2018/0035620 A1 | 2/2018 | Vilgiate |
| 2018/0054974 A1 | 3/2018 | Vasilenko |
| 2018/0070537 A1 | 3/2018 | Vasilenko |
| 2018/0116025 A1 | 4/2018 | Adams |
| 2018/0213735 A1 | 8/2018 | Vail |
| 2018/0220592 A1 | 8/2018 | Gilley |
| 2018/0228093 A1 | 8/2018 | Aikala |
| 2018/0242539 A1 | 8/2018 | Bhattacharya |
| 2018/0295787 A1 | 10/2018 | Grajcar |
| 2018/0295788 A1 | 10/2018 | Grajcar |
| 2018/0317398 A1 | 11/2018 | Wells |
| 2019/0107660 A1* | 4/2019 | Franck ............... F21V 7/09 |
| 2019/0110406 A1 | 4/2019 | Adams |
| 2019/0174594 A1 | 6/2019 | Grajcar |
| 2019/0239444 A1 | 8/2019 | Hanson |
| 2019/0259108 A1 | 8/2019 | Bongartz |
| 2020/0093072 A1* | 3/2020 | Pickett ............... A01G 7/045 |

* cited by examiner

Stacked Grow Layers

US 10,764,981 B2

TUNABLE LED LIGHT ARRAY FOR HORTICULTURE

CROSS-REFERENCE TO RELATED APPLICATION

This application claims priority back to U.S. Patent Application No. 62/717,683 filed on Aug. 10, 2018.

TECHNICAL FIELD

This patent document relates to lighting systems, devices, and techniques for providing lighting to plants.

BACKGROUND

Lighting provided by electrical devices instead of natural lighting from the sun is an important source of lighting for horticultural. Various lighting technologies have been used such as incandescent lights, metal halide lights, high pressure sodium lights, and fluorescent lights. LED lights have started to be used for indoor and outdoor lighting. New techniques and technologies are needed for horticultural lighting that take advantage of the recent improvements in LED lights.

SUMMARY

Disclosed are devices, methods, and techniques for providing photosynthetically active radiation (PAR) or light for plants. Lighting fixtures including light emitting diodes (LEDs) are disclosed than can be used as lighting for plants. The disclosed LED PAR sources can be adjusted according to plant species and growth conditions and provide the correct wavelengths of light (300-800 nanometers (nm)) for photosynthesis with a uniform intensity across the LED lighting fixture. The intensity and mixture of wavelengths provided by the LED lighting fixture can be controlled by adjusting the electrical power delivered to individual LEDs included in the LED device.

In one aspect, the disclosed technology can be implemented to provide a horticultural lighting apparatus. The apparatus includes a plurality LEDs producing light with different colors, wherein the plurality of LEDs is controlled to produce a predetermined proportion of the different colors. The apparatus further includes a waveguide structure coupled to the plurality of LEDs causing a mixing of the light from the plurality of LEDs, wherein waveguide output light from the waveguide structure is a uniform intensity across the apparatus and has a uniform mixture of the different colors.

The following features may be included in various combinations. The apparatus may include a brightness enhancing film coupled to the waveguide structure to generate output light, wherein the brightness enhancing film is structured to control a directionality of the waveguide output light. The apparatus may include an optical detector coupled to receive light from the plurality of LEDs, wherein each of the plurality of LEDs is powered by a driver from a plurality of drivers, and wherein a current supplied by each driver is determined by a calibration for each LED associating each LED's optical output intensity with a supplied current, and wherein the optical detector is used generating the calibration for each LED. The plurality of LEDs may be controlled by the plurality of drivers and a processor to produce a predetermined proportion of the different colors. The predetermined proportion of colors of light may be selected to affect growth of a plant. The brightness enhancing film may increase a lighting intensity of the output light. The different colors may include two or more of blue, deep red, far red, white, ultraviolet B, or ultraviolet C. The predetermined proportion of the different colors may be changed for different plants affect growth of the different plants. The predetermined proportion of colors of light may be selected to affect eliminate pests, bacteria, and/or odors. The predetermined proportion of colors of light may be selected to provide visible lighting for worker safety and comfort. The different colors of the LEDs may be selected to coincide with, or overlap, a range of wavelengths to which photosynthesis has a high sensitivity compared to other wavelengths.

In another aspect, the disclosed technology can be implemented to provide a method of generating lighting for illuminating one or more plants. The method includes providing light with a plurality of colors, wherein each color is provided by a different light emitting diode (LED), mixing the light in a waveguide to generate output light with a uniform mixture of the plurality of colors and a uniform light intensity, wherein the uniform mixture of colors is predetermined, and enhancing the brightness of the output light in a range of predetermined directions, wherein the predetermined directions are controlled by a brightness enhancing film.

The method may include one or more of the following features. The method may include controlling the LEDs by a plurality of drivers and a processor to produce a predetermined proportion of the different colors. The predetermined proportion of colors of light may be selected to affect growth of a plant. The brightness enhancing film may increase a lighting intensity of the output light. The different LEDs may generate light with two of more of the following colors: blue, deep red, far red, ultraviolet B, or ultraviolet C. The method includes adjusting the predetermined proportion of the different colors for different plants affect growth of the different plants.

In another aspect, the disclosed technology can be implemented to provide a method of calibrating a horticultural light source. The method includes providing a plurality of control signal values to an LED driver circuit selected from a plurality of LED driver circuits and associated with an LED, wherein each LED driver circuit is associated with a different LED, wherein the LED driver circuit provides a series of different driver currents and voltages to the LED and driver circuits not selected turn-off the remaining LEDs. The method includes measuring the light output intensity of the LEDs as a function of the series of different driver currents and voltages, and storing a table for the selected LED and associated driver circuit representing the measured light output intensity as a function of the driver circuit currents and voltages. The method includes repeating the providing, the measuring, and the storing for each of the plurality of LEDs and associated driver circuits.

The method of calibrating may include one or more of the following features. The providing, the measuring, the storing, and the repeating may be performed periodically. Periodically may include once per day, week, or month.

The above and other aspects and their implementations are described in greater detail in the drawings, the description and the claims.

DETAILED DESCRIPTION

Figure 1:
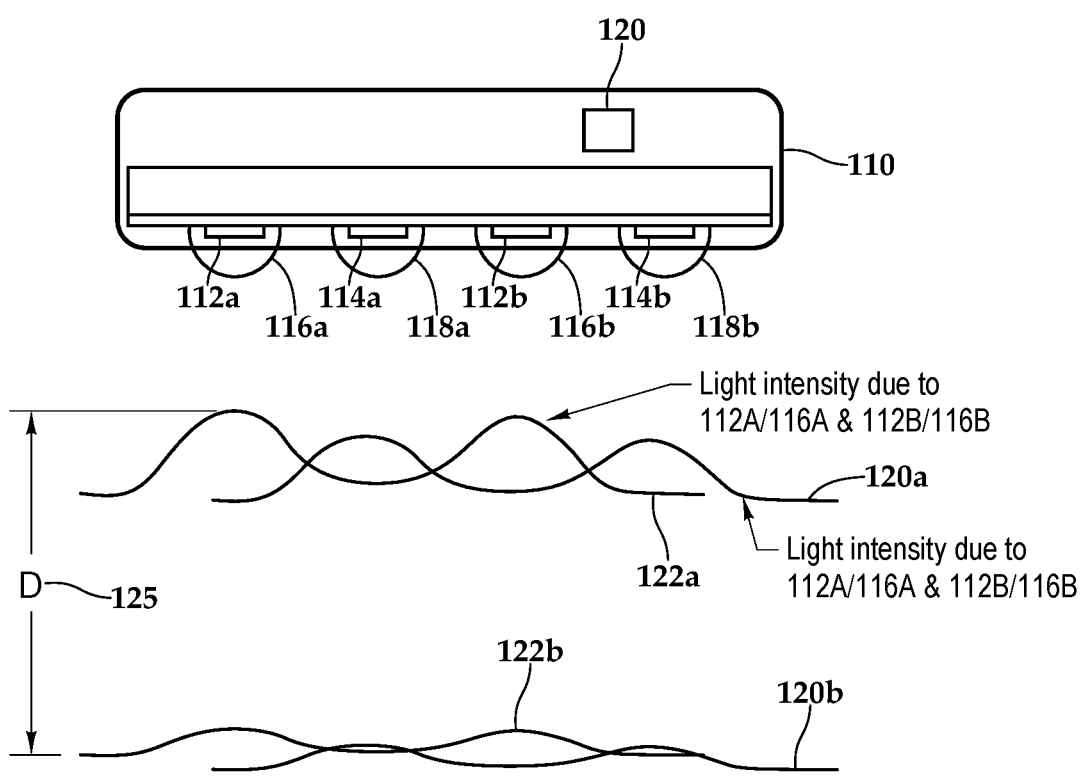
FIG. 1 depicts an example of a prior art lighting apparatus.

Disclosed in this patent document are devices, methods, and techniques for providing photosynthetically active radiation (PAR) or light for plants. Lighting fixtures including light emitting diodes (LEDs) are disclosed than can be used as lighting for plants grown indoors or outdoors. The disclosed LED lighting fixtures significantly reduce power consumption for horticulture lighting, extend useful lifetimes, provide the wavelengths needed by plants to optimize growth, and provide growers with the ability to control PAR in order to optimize plant growth strategies. For example, the disclosed LEDs can be used to adjust time to market of the plants, plant attributes, and the expression of plant constituents. The disclosed LED PAR sources can be adjusted according to plant species and growth conditions to optimize production and achieve required operational cost objectives. The disclosed LEDs provide the correct wavelengths of light (300-800 nanometers (nm)) for photosynthesis with a uniform intensity across the LED lighting fixture thereby providing an even photon delivery to the plant canopy and into the underlying leaves within the plant canopy. The intensity and mixture of wavelengths provided by the LED lighting fixture can be controlled by adjusting the electrical power delivered to individual LEDs included in the LED device. The narrow and flat form factor of the lighting fixture, and lower power dissipation of the LED devices allows placing the lighting fixture in close proximity to the plants thereby enabling vertical stacking of the lighting fixtures and plants. This provides a platform to optimize the configuration of indoor grow facilities resulting in higher production per square foot of floor area. The disclosed LED lighting fixtures enable automated operation and full facility monitoring.

The disclosed subject matter includes a spectrum adjustable solid-state lighting fixture with high-efficiency, high photon flux density, and a spatially uniform output optimized for plant growth. The disclosed LED lighting fixtures meet the need for lighting fixtures that provide homogenous high intensity controllable photosynthetic active radiation as a grow ingredient for indoor/outdoor and greenhouse agriculture grow facilities.

The disclosed LED lighting fixtures (also referred to herein as a "device") includes LEDs positioned at opposite ends of an optical waveguide. The LEDs in this configuration may be referred to as edge LEDs. The edge LEDs can have different emission spectra (e.g., colors). Light exiting the top surface of the waveguide has a high spatial uniformity of light intensity and color enabling the plant to be near the light fixture without having hot/dark spots and having the colors of the LEDs fully mixed. The different colors of the edge LEDs are well mixed inside the waveguide. The proportions of the various colors of LEDs can be tailored via a driver for each LED controlled by a processor to optimize the light produced for individual plants, grower processes, and plant species. The different colored LEDs may include but are not limited to blue, deep red and far-red, UVB, UVC (to eliminate pests, fungus, bacteria, odors), white (to support plant growth for certain types of plants and provide visible lighting for worker comfort), as well as other colors.

The waveguide in the lighting fixture captures light from the edge LEDs via total internal reflection at the waveguide surfaces and propagates the light along the waveguide. Imperfections created on the lower surface of the waveguide cause a scattering of light at the locations of the imperfections. The imperfections scatter light like point sources at the locations of the imperfections. Some of the scattered light, light that arrives at the top surface of the waveguide at an angle less that the critical angle for total internal reflection, passes through the top surface of the waveguide and exits the waveguide. Scattered light that arrives at the top surface of the waveguide at an angle equal or greater than the critical angle is reflected back into the waveguide.

Light that exits the top surface of the waveguide passes to a brightness enhancing film (BEF). The BEF produces a directional photon output with increased lighting intensity (flux/area) by 2-3×. The BEF reduces waste due to light leakage out the side of the fixture.

The disclosed lighting device includes passive heat dissipation without needing active cooling provided by a fan. The method of attachment of the LEDs integrated into the frame provides improved heat dispersal. The low-power dissipation of the disclosed device enables the device to be smaller and less expensive than previous approaches.

The disclosed lighting device is low-profile thereby saving space via a detached driver circuit which allows closer spacing for vertically stacked rows of plants such as in an indoor grow facility.

FIG. 1 depicts an example of a prior art lighting apparatus 110. Lighting apparatus 110 includes LEDs 112A, 112B, 114A, and 114B. Each LED includes focusing optics; LED 112A is coupled to focusing optics 116A, LED 112B is coupled to focusing optics 116B, LED 116A is coupled to focusing optics 118A, and LED 116B is coupled to focusing optics 118B. Close to the LEDs 112A/B, the light intensity 122A is high. Similarly, close to the LEDs 114A/B, the light intensity 120A is high close. The light intensity due to any particular LED drops quickly as a function of distance away from the LED. As such, the combined intensity due to all the LEDs has significant peaks and valleys and therefore does not have uniform intensity. In order to reduce the peaks and valleys, the lighting fixture 110 must be placed a large distance D 125 away. The prior art example in FIG. 1 requires a fan for cooling high-powered LEDs needed in part due to the large distance D required.

Figure 2:
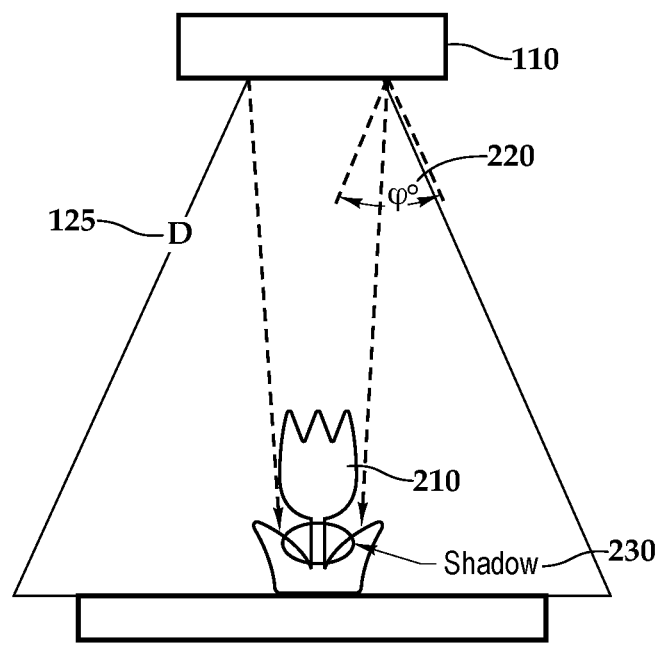
FIG. 2 depicts an example of a problem with the prior art approach.

FIG. 2 shows another problem with the prior art approach. Because the lighting fixture 110 must be placed a large distance D 125 from plant 210, the angles φ 220 that the light from the lighting fixture 110 are incident on plant 210 have a reduced maximum value thereby casting shadows 230 at lower leaves due to upper leaves on the plant 210. This reduces photosynthesis on the shadowed leaves. The large distance D 125 also reduces the light intensity and causes wasted light because not all of the light from the LEDs is incident on the plant.

Figure 3:
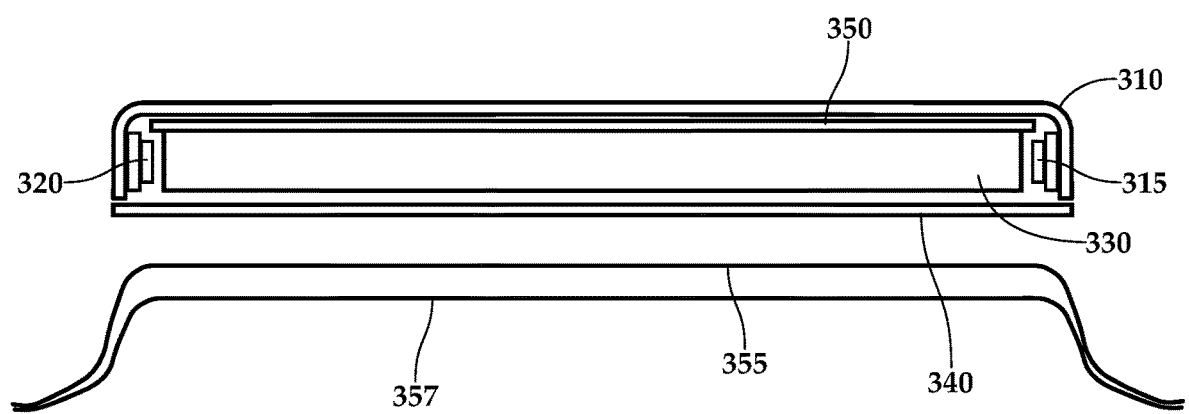
FIG. 3 depicts an example of a lighting fixture for horticultural lighting.

FIG. 3 depicts a lighting fixture 310 for horticultural lighting, in accordance with some example embodiments. Lighting fixture 310 includes one or more edge LEDs 315 and 320. LEDs 315/320 may include arrays of LEDs such as one or two-dimensional arrays of LEDs. Lighting fixture 310 includes waveguide 330, brightness enhancing film 340, and reflective layer 350. Lighting fixture 310 produces light output that has a uniform distribution of the light from each of the edge LEDs. At 355 is an example of a plot of light intensity from LED 315 as a function of position along the lighting fixture 310. The light intensity is equal or nearly equal along the fixture indicating the uniform distribution of the light generated by LED 315. Similarly, at 357 is an example of a plot of light intensity from LED 320 as a function of position along the lighting fixture 310. The light intensity is equal or nearly equal along the fixture indicating the uniform distribution of the light generated by LED 320. In the examples shown at 355 and 357, the total light output produced by LED 315 is greater than the light from LED 320 as indicated by the lower value corresponding to LED 320. The examples 355 and 357 are for illustrative purposes and any other amplitudes may be used. Low power LEDs may be used thereby eliminating a need for a cooling fan and enabling a heat sink 370 to provide sufficient cooling. Lighting fixture 310 is further detailed in FIG. 5.

The LEDs 315 and 320 may be selected to produce light at wavelengths with high absorption during the process of photosynthesis. For example, the process of photosynthesis may absorb light at some wavelengths such as red light with higher efficiency than other wavelengths such as green light. The process of photosynthesis may absorb light in bands of wavelengths, and may absorb light efficiently in multiple bands of frequencies. Some of the LEDs in the lighting fixture may be selected that produce light in one of the bands that are efficiently absorbed during photosynthesis. Other LEDs in the lighting fixture may be selected that produce light in one of the other bands that are efficiently absorbed during photosynthesis.

Figure 4:
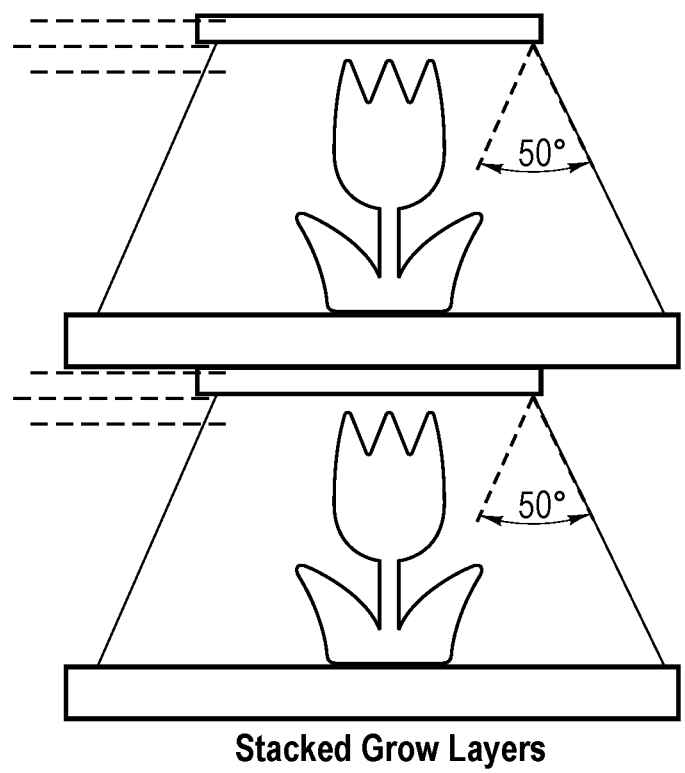
FIG. 4 depicts an example of a stacked arrangement of plants and lighting fixtures.

FIG. 4 depicts a stacked arrangement of plants and lighting fixtures enabled by the disclosed subject matter. In FIG. 4, lighting fixtures 310 can be placed in close proximity to plants 410 and 420 due to the uniform illumination (color and amplitude) provided by lighting fixtures 310. The close proximity of lighting fixtures 310 to the plants 410 and 420 reduces shadowing thereby providing more complete illumination of the leaves throughout the plants including leaves below the higher layer(s) of leaves. The illumination provided by the lighting fixtures is not wasted because the illumination from the lighting fixtures are limited to the area of the plants. The low power dissipation in the lighting fixtures 310 eliminates heat damage to the plants even when the lighting fixtures are in close proximity to the plants.

Figure 5A:
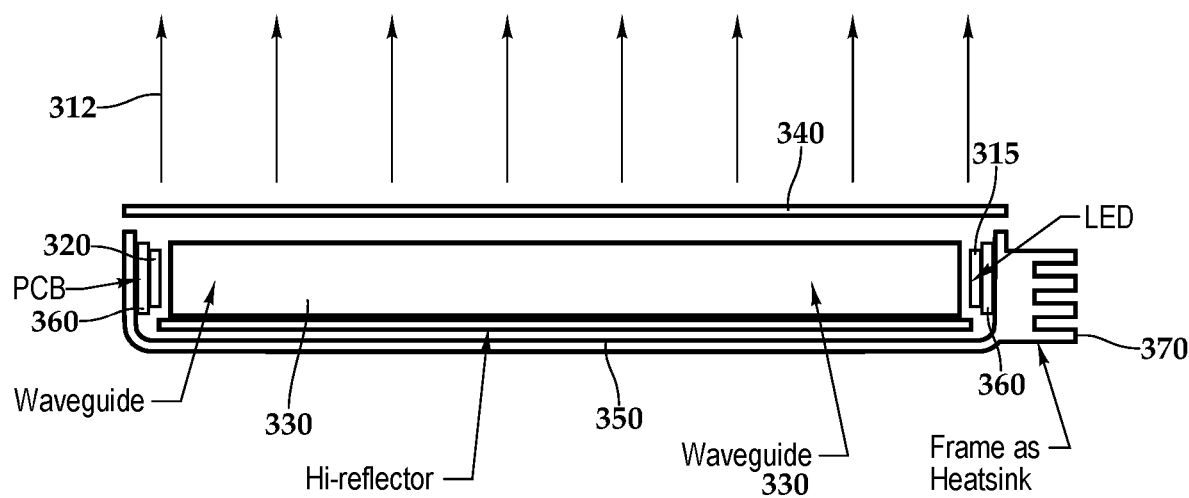
FIG. 5A depicts another example of a lighting fixture.

FIG. 5A depicts a lighting fixture, in accordance with some example embodiments. The LED lighting fixture 310 produces directional light 312 using edge LEDs. The LED lighting fixture 310 includes one or more LEDs such as LEDs 315 and 320 configured on one or more corresponding PCBs 360 that are located along the sides within the interior of the lighting fixture 310. For example, the LEDs 315/320 can include, but are not limited to various types of light emitting diode semiconductor chips, e.g., including low power LEDs and/or middle range power LEDs, edge emitting LEDs, vertical-cavity surface-emitting lasers (VCSELs) or vertical external-cavity surface-emitting lasers (VECSELs). or various combinations thereof. For example, multiple LEDs can be organized in an array on at least one of the PCBs 360, in which each LED is arranged at a particular distance apart from a neighboring LED in the array. For example, the LEDs 315/320 can be spaced uniformly apart in a two-dimensional arrangement or a one-dimensional line on the PCB 360. In another example, the LEDs 315/320 can be arranged nonuniformly on the PCB 360, e.g., such as in subgroups. Also, for example, the LED lighting fixture 310 can include an array of one or more LEDs 315/320 configured on an array of PCBs 360 arranged along opposing sides of the interior of the lighting fixture 310. In other examples, the lamp 310 may include a single LED semiconductor chip on a single PCB 360 residing along the side of LED lighting fixture 310. The PCBs 360 can include circuitry to interface with a power supply (not shown) to drive the device 315/320. For example, the power supply can be configured to the exterior of the lighting fixture and provide power to each LED via a connection with each PCB 202, e.g., such as using interconnecting wires between the undersurface of the PCB 202 and the externally-located power supply. Drivers for each LED 315/320 may be included in the lighting fixture 310.

The LED lighting fixture 310 includes an optical waveguide 330 contained within the LED lighting fixture 310. For example, the optical waveguide 330 can be positioned between LEDs 315/320 positioned on opposite ends of the side interior of the LED lighting fixture 310, e.g., with one end of the waveguide aligned with the LEDs 315 on one side of the waveguide 330 and the opposite end of the waveguide aligned with the oppositely aligned LEDs 320 on the other side of the waveguide 330. The optical waveguide 330 can be in various geometrical configurations, such as a waveguide plate as shown. As the light in the optical waveguide 330 is guided, the spatial power distribution of the light becomes uniform or nearly uniform. The optical waveguide 330 provides a mechanism for guided light to spatially mix to produce a uniform color and optical intensity.

The lighting fixture 310 includes a reflective layer 350 positioned substantially adjacent to the non-aperture side of the optical waveguide 330. For example, the reflective layer 350 has a reflective surface having high reflectance that prevents light that escapes the waveguide 330 from escaping the lighting fixture, e.g., redirecting the light back into the waveguide 330. Also, for example, the interior surface of the light fixture can be configured to also be highly reflective.

Figure 5B:
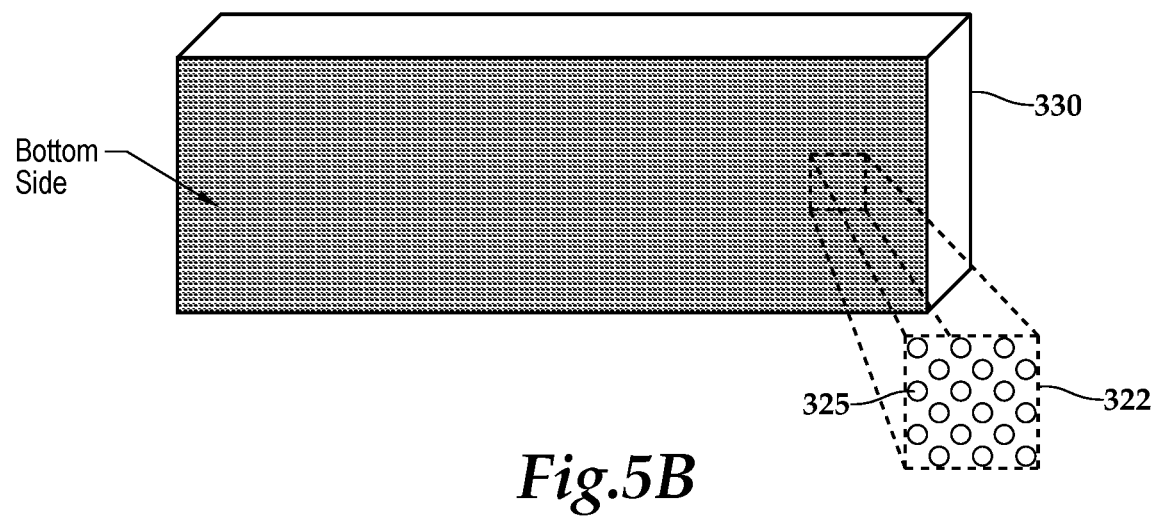
FIG. 5B shows an example of an optical waveguide, in accordance with some example embodiments.

FIG. 5B shows an example of the optical waveguide 330. The optical waveguide 330 may be positioned between the LEDs 315/320 that are arranged to emit light into opposite sides of the optical waveguide 330 as shown in FIG. 5A (LEDs not shown in FIG. 5B). In this example, the optical waveguide 330 is configured to be a flat, rectangular waveguide, e.g., with all sides of the waveguide polished. In some example embodiments, the bottom side of the optical waveguide 330 can include a pattern of scattering/reflective spots 325, e.g., such as laser marks, 'white paint' marks (e.g., of TiO$_2$ or other high reflective material), etc., as shown at 322 of FIG. 5B. For example, the density and distribution of the spots 325 can affect the light output.

Figure 5C:
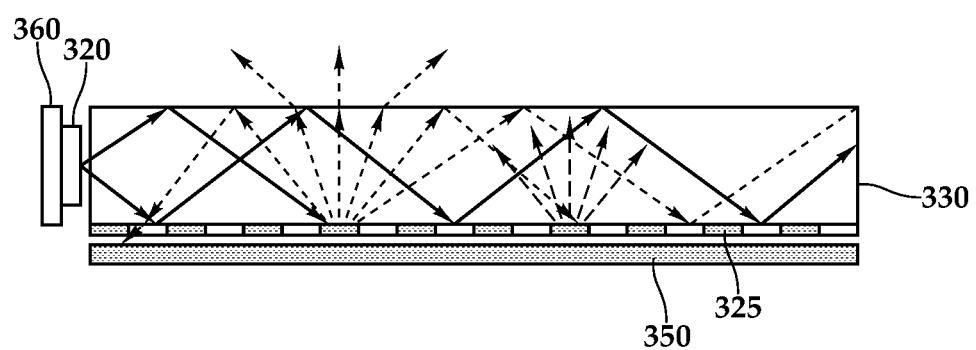
FIG. 5C depicts a ray diagram of an exemplary LED-based lighting fixture, in accordance with some example embodiments.

FIG. 5C shows a ray diagram 530 of the exemplary LED-based directional lighting device 310. For example, one or more of the LEDs 315/320 can be switched on to emit light that enters the waveguide 330 at varying directions. Some of the light that travels towards the aperture side of the waveguide 330 contacts the surface at an incident angle that is reflected within the waveguide 330 due to total internal reflection based on the optical properties of the waveguide 330. The light that travels towards the bottom side of the waveguide 330 can contact a reflective portion of the surface, e.g., at one of the spots 325, which can scatter the light in a variety of directions that can be reflected or refracted by the waveguide. For example, some of the scattered light that travels towards the aperture side of the waveguide 330 can be refracted and exit the waveguide 330 based on the incident angle at which it contacts the surface. Light that travels towards the bottom side of the waveguide 330 can meet a nonreflective portion of the surface which may be reflected within the waveguide 330 due to total internal reflection, or may be refracted through the bottom side of the waveguide towards the reflective layer 350. The reflective layer 350 reflects the escaped light and redirects the light back into the waveguide 330, thereby preventing light from escaping the lighting fixture. For example, some of the light that travels directly towards the aperture side of the waveguide 330 from the LED 320 may contact the surface at a particular incident angle that may be refracted (e.g., depending on the optical properties of the waveguide, such as the index of refraction) and exit the waveguide 330. In some examples, the waveguide 330 may include poly (methyl methacrylate) (PMMA) (which can have an index of 1.4), in which no light that travels directly to the aperture side of the PMMA waveguide 330 from the LED 320 is refracted and, rather, is internally reflected.

Referring to FIG. 5A, the LED lighting fixture 310 includes the brightness enhancing film (BEF) 340 configured along the emitting surface of the lighting fixture 310 positioned to receive light emitted from the surface of waveguide 330. In this exemplary arrangement, the LED emitted light can exit the waveguide 330 and be received by and selectively transmitted by the BEF 340 to produce directional light emitted by the lamp 310. For example, the BEF 340 permits only selected light (e.g., light at particular incident angle(s)) to exit the LED lamp 310 and recycles the unselected light back into the waveguide 330, similar to that described above. Thus, the BEF 340 effectively acts to produce more uniformly directional light to be transmitted through the lighting fixture 310, e.g., which increases on-axis luminance, and thereby increases the intensity of overall light produced by the lamp 310.

Figure 6:
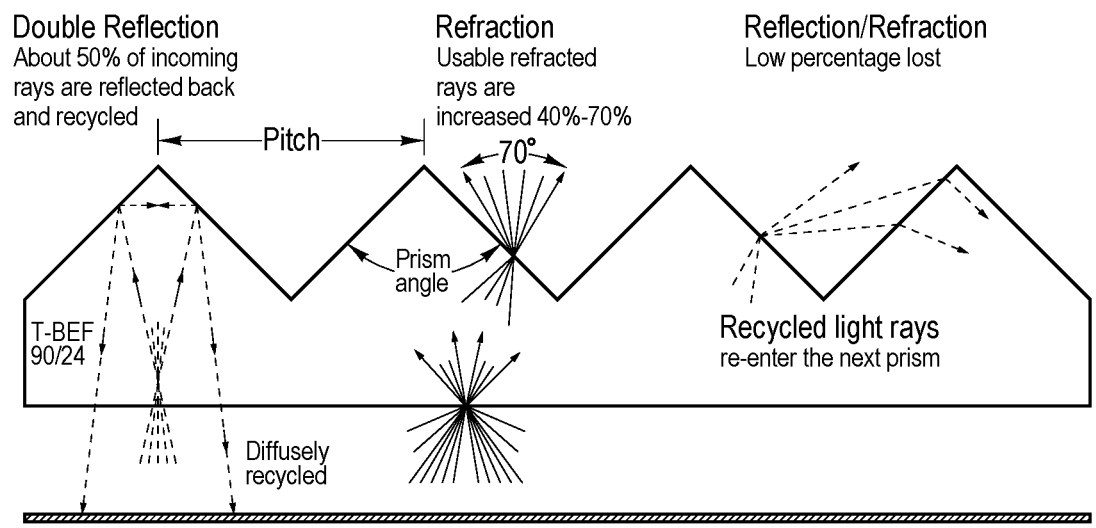
FIG. 6 depicts a brightness enhancing film including a prismatic structure, in accordance with some example embodiments.

The BEF 340 selects light rays with a range of incident angles to the BEF 340 to transmit while redirecting most or some of other light rays back to the waveguide 330 as recycled light that is reflected by the reflective interior surface back to the BEF 340 for further selection and recycling. This operation of the BEF 340 controls the directions of the transmitted light rays to provide a directional output for flood lighting and spot lighting devices and, in addition, via its recycling of the light, enhances the light brightness at the output of the LED lamp 310. The BEF 340 includes a micro-replicated enhancement film that utilizes a prismatic structure as shown in FIG. 6 to produce significant brightness gain. Exemplary ways how light rays are handled by the prismatic structure in selectively transmitting light rays while recycling light rays is shown in FIG. 6.

The collective operation of the waveguide 330, reflective layer 350, and BEF 340 contribute to the directionality of the output light.

Figure 7A:
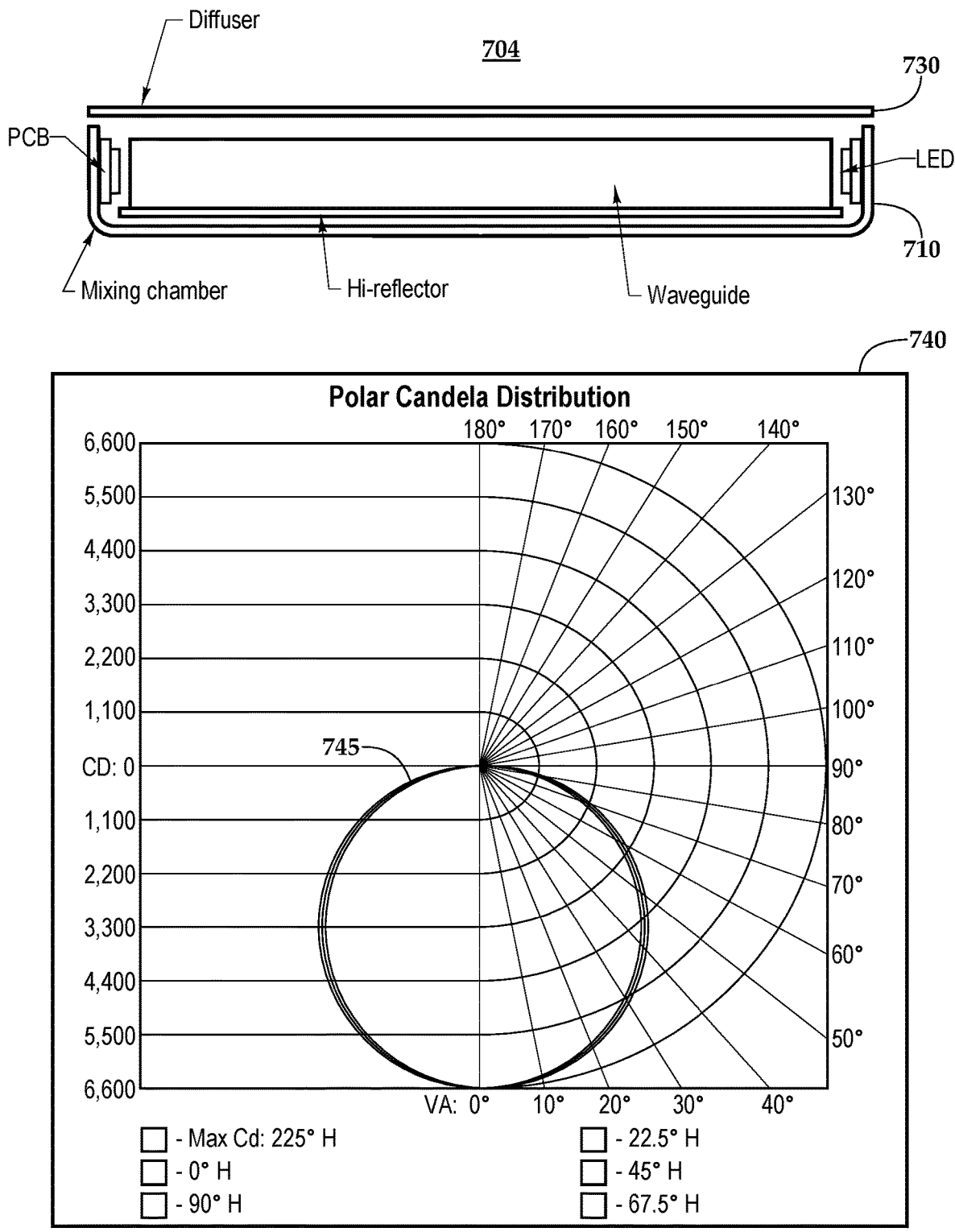
FIGS. 7A and 7B depict examples of two configurations of LED lighting fixtures.
Figure 7B:
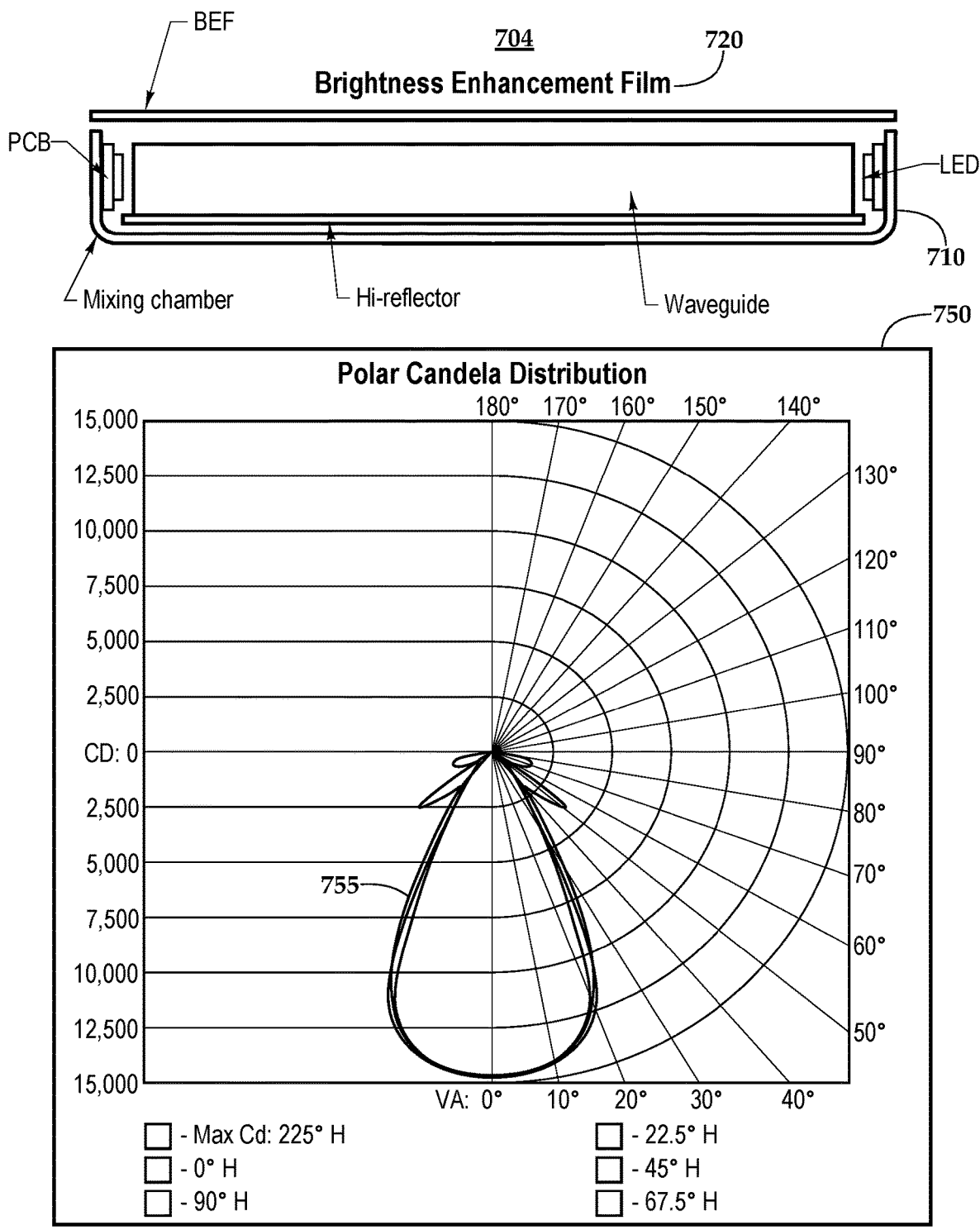

FIGS. 7A and 7B depict two configurations of LED lighting fixtures. Lighting fixture 702 includes LED lamp 710 and brightness enhancing film 720, which are further described above. Shown at 750 is an example of a polar candela distribution for the lighting fixture 702. The plot 755 shows a directional distribution of light from the lighting fixture 702 which is the same or similar to the lighting fixture 310 including brightness enhancing film 340. Lighting fixture 704 includes LED lamp 710 and diffuser 730. Instead of the directional properties of brightness enhancing film 720, diffuser 730 distributes light uniformly in all directions as can be seen by plot 745. In some example embodiments, diffuser 730 may be used in a lighting fixture, and in some embodiments, brightness enhancing film 720 may be used.

Figure 8:
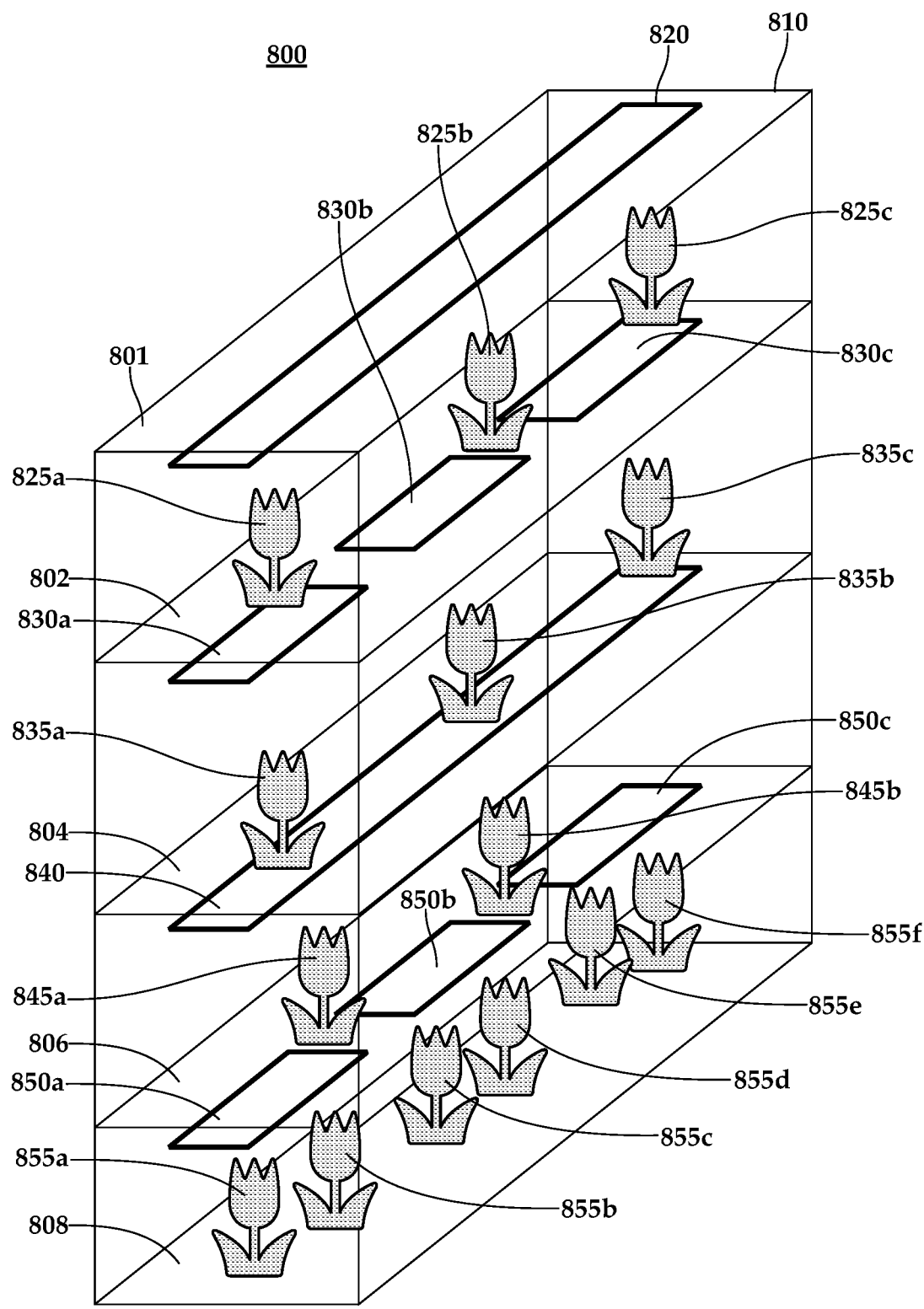
FIG. 8 depicts an example of a stacked shelving system for growing plants, in accordance with some example embodiments.

FIG. 8 depicts an example of a stacked shelving system 800 for growing plants, in accordance with some example embodiments. The stacked shelving system includes multiple levels with each level having one or more LED lighting fixtures. In the example of FIG. 8, five levels are shown at 801, 802, 804, 806, and 808. Each level 802, 804, and 806 may provide placement of plants on a topside and an attachment for one or more LED lighting fixtures on an underside. Level 801 is the top level in FIG. 8 and provides for an attachment for one or more LED lighting fixtures with no plants on that level. Level 808 is the bottom level and provides support for plants with no lights underneath. Light fixture 820 is located on the underside of level 801. In the example shown, single light fixture 820 on the underside of level 801 provides illumination for plants 825A-C and includes LEDs with light output selected to cause photosynthesis. On the underside of level 802 are light fixtures 830A, 830B, and 830C, where light fixture 830A illuminates plant 835A, light fixture 830B illuminates plant 835B, and light fixture 830C illuminates plant 835C. Light fixtures 830A, 830B, and 830C may include different LEDs to produce light at different wavelengths or the same LEDs may be electrically driven differently to produce different proportions of the light from the different LEDs. For example, lighting fixture 830A may be driven to produce more blue light compared to red light for plant 835A and fixture 830B may be driven to produce more red light compared to blue light for plant 835B. A lighting fixture such as lighting fixture 840 may illuminate any practical number of plants. As shown in the example of FIG. 8, lighting fixture 840 illuminates two plants but any other number of plants could be illuminated. On the underside of level 806 are three lighting fixtures 850A, 850B, and 850C where each lighting fixture illuminates two plants 855I/B, 855C/D, 855E/F, respectively.

Figure 9:
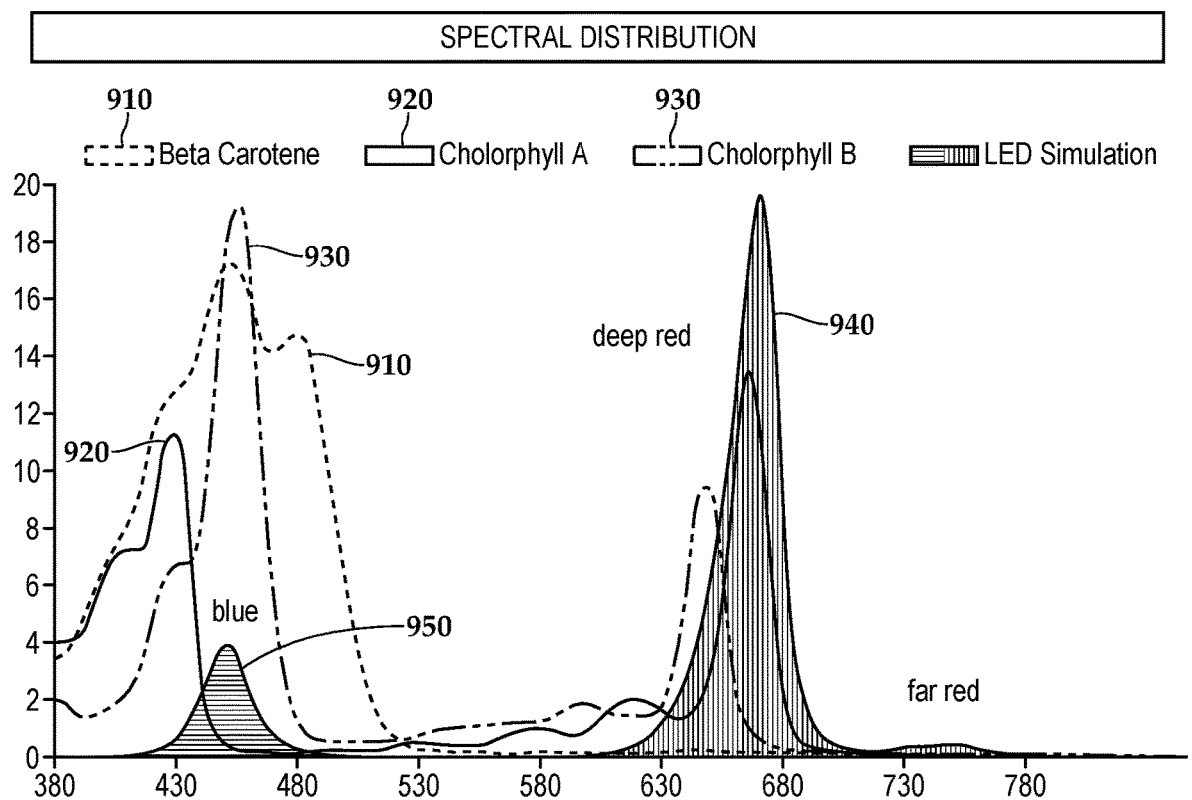
FIG. 9 depicts an example of a spectral absorption plot for various compounds related to photosynthesis.

FIG. 9 depicts an example of a spectral absorption plots for various compounds related to photosynthesis. On the x-axis is wavelength of light measured in nanometers (nm). and on the y-axis is light intensity. At 910 is an example of an absorption plot for beta carotene. At 920 is an example of an absorption plot for chlorophyll A and at 930 is an example of an absorption plot for chlorophyll B. Also shown in FIG. 9 are examples of spectral plots of light generated by two different LEDs that may be included in a lighting fixture such as lighting fixture 310/710. At 950 is an example of the spectral output from a blue LED. The spectral output of the blue LED overlaps the absorption bands of chlorophyll B and beta carotene but overlaps less of the chlorophyll A plot. In this way, the blue LED corresponding to spectral plot 950 may be a good choice to be included in a lighting fixture when the grower wants to stimulate beta carotene or chlorophyll B but would be a less effective choice for stimulation chlorophyll A. At 940 is another example of the spectral output from another LED, a red LED. The spectral output of the red LED overlaps the absorption by chlorophyll A and a little of chlorophyll B but does not overlap much of the absorption by beta carotene. As such, the red LED is best suited for chlorophyll A, less so for chlorophyll B, and is not well suited for beta carotene. In the foregoing example, two LEDs with different emission spectra are shown but LEDs with different emission spectra may be selected for lighting fixtures for horticultural purposes. Any other number of LEDs with different emission spectra may be included in the lighting fixture.

Figure 10:
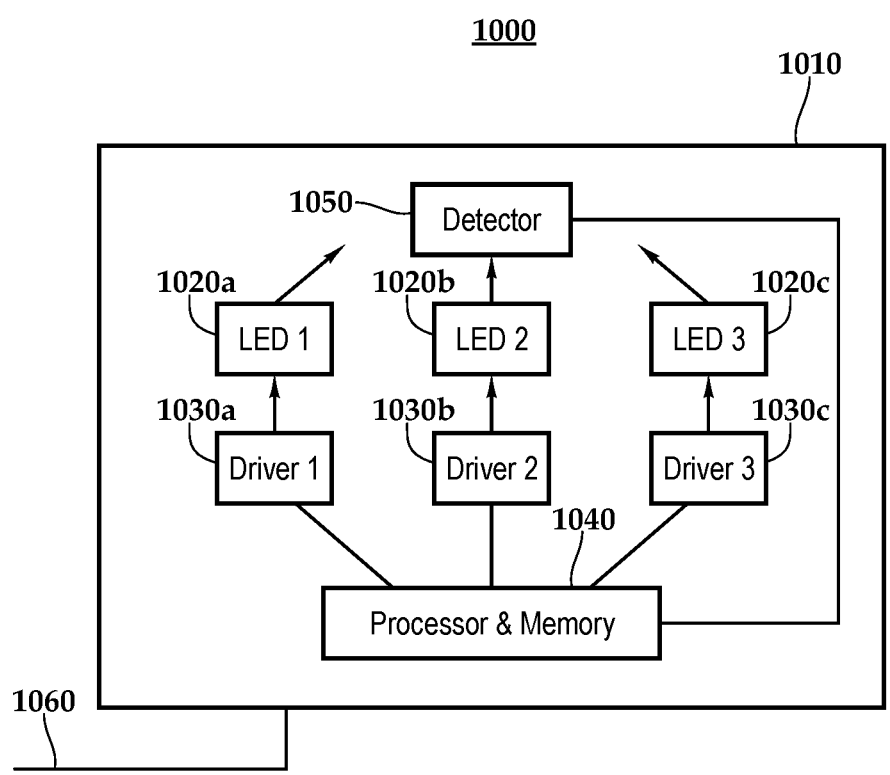
FIG. 10 depicts another example of a lighting fixture, in accordance with some example embodiments.

FIG. 10 depicts a lighting fixture 1010, in accordance with some example embodiments. In the example of FIG. 10, lighting fixture 1010 includes a plurality of LEDs 1020A-C, a driver circuit 1030A-C for each LED, a processor and memory 1040, and a detector 1040. Lighting fixture 1010 is controlled and powered via cable 1060.

LEDs 1020A-C can each be selected to produce different bands of wavelengths with high absorption during photosynthesis. For example, LED 1020A may produce light with the emission spectrum shown in FIG. 9 at 950, and LED 1020B may produce light with the emission spectrum shown at 940, and/or LED 1020C may produce light with an emission spectrum centered at 650 nm (not shown in FIG. 9). Lighting fixture 1010 may include any number of additional LEDs more or fewer than the three shown in FIG. 10.

Each LED 1020A-C in FIG. 10 has an associated driver circuit 1030A-C. The LED driver circuits may control a voltage and/or current to its associated LED, and/or may control a duty cycle for pulsing an LED. For example, driving an LED with more current will cause the LED to generate a higher light intensity and driving a LED with a higher percentage duty cycle will generate a higher average light intensity. Different LEDs may generate different amounts of light for the same drive current/voltage/duty cycle due to the characteristics of the LED itself. LEDs may also age over time which can cause the LED to produce less light for the same drive current/voltage/duty cycle. The driver circuits 1030A-C can be controlled by processor and memory 1040.

Processor and memory 1040 can control the driver circuits 1030A-C to provide various voltage/current/duty cycle to LEDs 1020A causing the LEDs to produce a corresponding amount of light. Detector 1050 can provide an electrical signal indicating a light intensity at the detector 1050. For a predetermined current/voltage provided to one of the LEDs 1020A-C, a corresponding light intensity may be determined via detector 1050. Detector 1050 may produce a voltage or current that is digitized and input into processor and memory 1040. Each LED may be calibrated by controlling the driver for that LED while turning-off the other LEDs. In this way, a look-up table may be created for each LED associating a driver control signal over a range for current/voltage with a range of light output. The processor and memory may periodically re-calibrate each LED. For example, the look-up table for each LED may be updated once per day, per week, month, or other time.

Different plants, or the same plants during different parts of their life cycle, may best absorb different wavelengths. The proportion of light produced by each LED in the lighting fixture can be adjusted via processor and memory 1040 according to the plant and its stage of development.

Lighting fixture 1010 can be provided electrical power and control signals via cable 1060. For example, cable 1060 may carry electrical power to power the processor and memory 1040, driver circuits 1030A-C, and LEDs 1020A-C. Control signals such as commands to change the light intensity produced or the mixture of wavelengths in the light produced may be carried by cable 1060. Status information such as information about aging LEDs, or failed LEDs or driver circuits may be carried from the lighting fixture to a central controller (not shown). For example, cable may 1060 may include two wires for carrying power as well as status and control signals to/from lighting fixture 1010.

Figure 11:
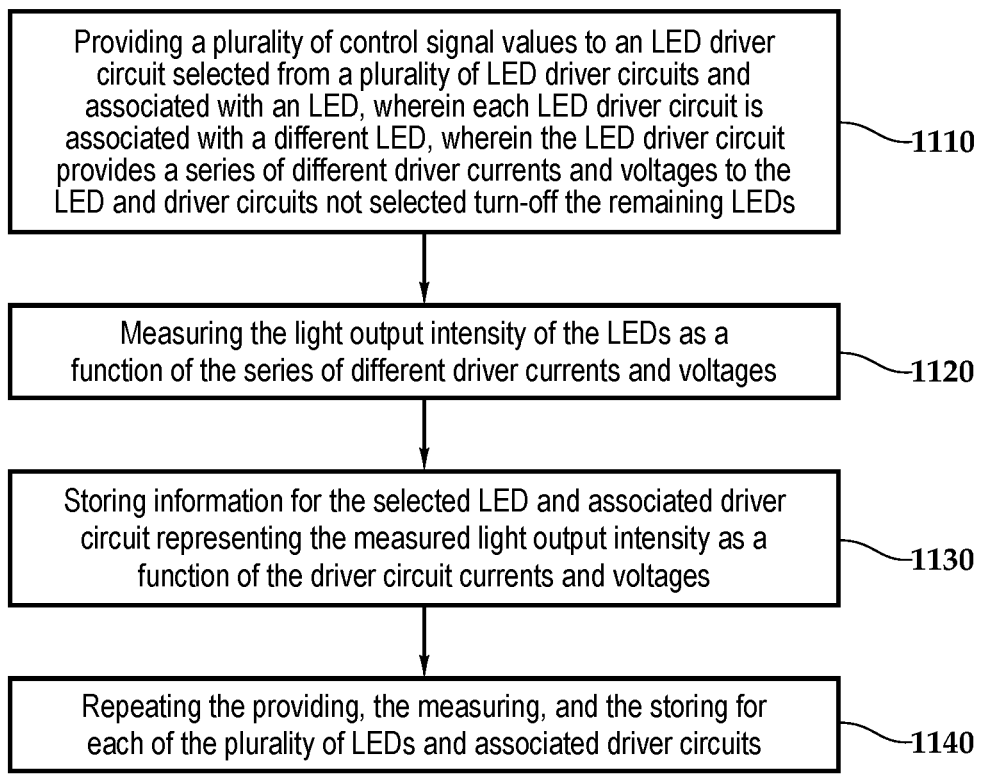
FIG. 11 depicts a process, in accordance with some example embodiments.

FIG. 11 depicts a process 1100, in accordance with some example embodiments. At 1110, a plurality of control signal values can be provided to an LED driver circuit selected from a plurality of LED driver circuits and associated with an LED. Each LED driver circuit is associated with a different LED, and the LED driver circuit provides a series of different driver currents and voltages to the LED. Driver circuits not selected turn-off the remaining LEDs. At 1120, the light output intensity of the LEDs is measured as a function of the series of different driver currents and voltages. At 1130, a table is stored for the selected LED and associated driver circuit representing the measured light output intensity as a function of the driver circuit currents and voltages. At 1140, the process is repeated for each of the N LEDs and their associated drivers. The foregoing process is performed by the LEDs, the driver circuits, and the processor and memory.

Figure 12:
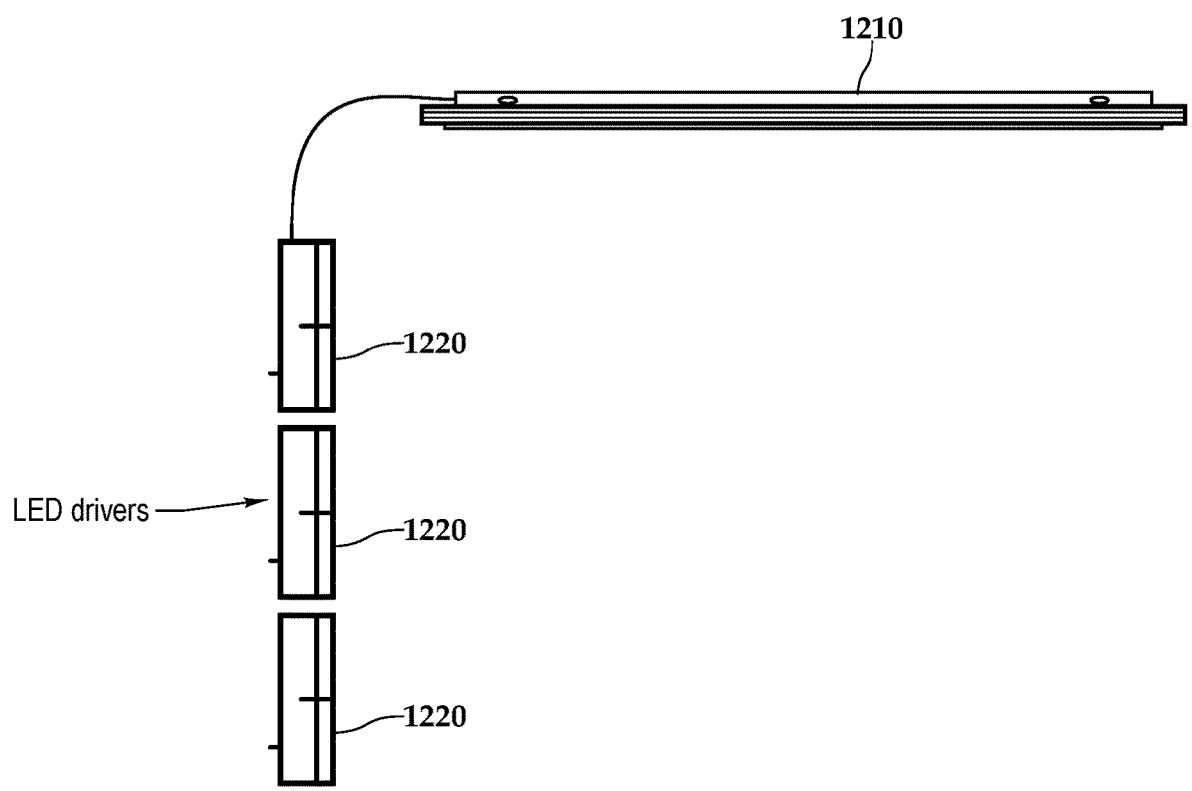
FIG. 12 depicts an example of an arrangement of LED lighting fixtures including LED lamps and driver circuits to enhance vertical compactness, in accordance with some example embodiments.

FIG. 12 depicts an example of an arrangement of LED lighting fixtures including LED lamps 1210 and driver circuits 1220 configured to be detachable to reduce the vertical thickness of the lighting fixture to enhance vertical compactness and enable more vertical stacking of plants and lighting fixtures. In some example embodiments, the driver circuits 1220 may be placed on top of or adjacent to the LED lamps 1210.

Figure 13A:
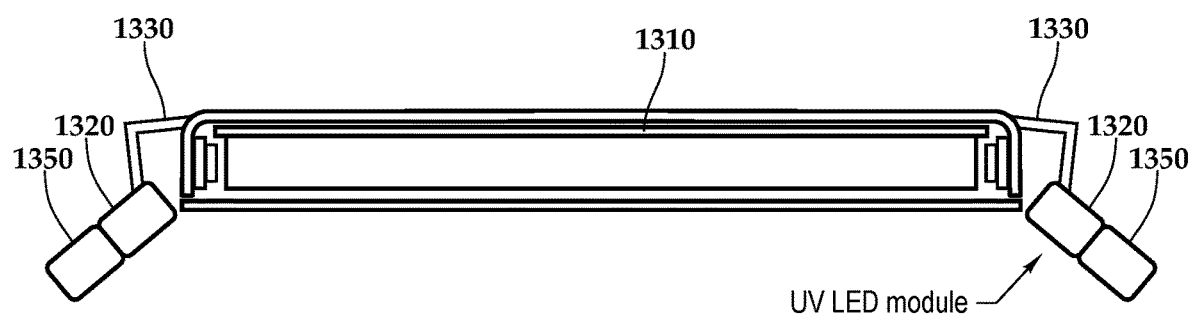
FIGS. 13A and 13B depict a lighting fixture including ultraviolet (UV) LEDs, in accordance with some example embodiments.
Figure 13B:
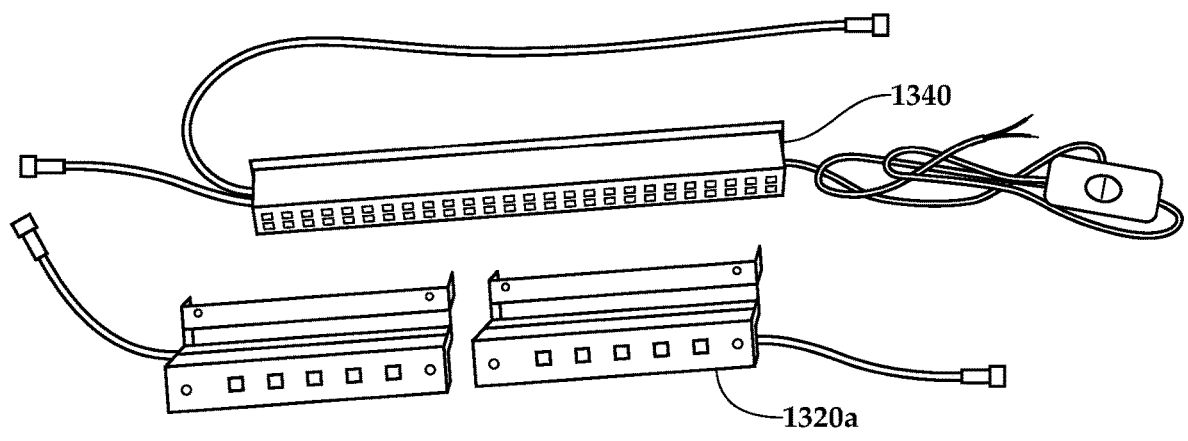

FIGS. 13A and 13B depict a lighting fixture 1310 such as 310, 710, or 1210 described above that further includes ultraviolet (UV) LEDs 1320 which can be attached to lighting fixture 1310 with brackets 1330. The brackets 1330 can allow for adjustment to the direction of illumination for the ultraviolet light. For example, the bracket 1330 may allow for swiveling in one or two dimensions thereby allowing the direction of illumination to be adjusted in two dimensions. At 1320A is a picture of an example of a UV LED. Shown at 1340 is an example of a power supply for supplying electrical power to UV LEDs.

In some example embodiments, white or green LED 1350 may replace, or be added to ultraviolet (UV) LEDs 1320. When added, the white or green LEDs 1350 can be attached to UV LEDs 1320 (shown) or directly to lighting fixture 1310 with brackets (not shown) similar to brackets 1330. The white or green LEDs may provide a more comfortable working environment and/or may provide a needed stressor to the plants.

The disclosed technology can be implemented in various ways, including, for example, the technical features in Appendices A and B. Appendix A is entitled "LED Based Directional Lighting Devices" and is 51 pages. Appendix B is entitled "Adjustable Solid State Illumination Module Having Array of Light Pixels" and is 12 pages. Both are part of the disclosure of this patent document.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A horticultural lighting apparatus comprising:
   a plurality of light emitting diodes (LEDs) producing light with different colors, wherein the plurality of LEDs is controlled to produce a predetermined proportion of the different colors;
   a waveguide structure coupled to the plurality of LEDs causing a mixing of the light from the plurality of LEDs, wherein waveguide output light from the waveguide structure is a uniform intensity across the apparatus and has a uniform mixture of the different colors;
   a brightness enhancing film coupled to the waveguide structure to generate output light, wherein the brightness enhancing film is structured to control a directionality of the waveguide output light; and
   an optical detector coupled to receive light from the plurality of LEDs, wherein each of the plurality of LEDs is powered by a driver from a plurality of drivers, and wherein a current supplied by each driver is determined by a calibration for each LED associating each LED's optical output intensity with a supplied current, and wherein the optical detector is used generating the calibration for each LED.

2. The horticultural lighting apparatus of claim 1, wherein the plurality of LEDs are controlled by the plurality of drivers and a processor to produce a predetermined proportion of the different colors.

3. The horticultural lighting apparatus of claim 2, wherein the predetermined proportion of colors of light are selected to affect growth of a plant.

4. The horticultural lighting apparatus of claim 2, wherein the predetermined proportion of the different colors is changed for different plants affect growth of the different plants.

5. A horticultural lighting apparatus comprising:
   a plurality of light emitting diodes (LEDs) producing light with different colors, wherein the plurality of LEDs is controlled to produce a predetermined proportion of the different colors;
   a waveguide structure coupled to the plurality of LEDs causing a mixing of the light from the plurality of LEDs, wherein waveguide output light from the waveguide structure is a uniform intensity across the apparatus and has a uniform mixture of the different colors; and
   a brightness enhancing film coupled to the waveguide structure to generate output light, wherein the brightness enhancing film is structured to control a directionality of the waveguide output light;
   wherein the different colors of the LEDs are selected to coincide with, or overlap, a range of wavelengths to which photosynthesis has a high sensitivity compared to other wavelengths.

6. A method of calibrating a horticultural light source, comprising:
   providing a plurality of control signal values to an LED driver circuit selected from a plurality of LED driver circuits and associated with an LED, wherein each LED driver circuit is associated with a different LED, wherein the LED driver circuit provides a series of different driver currents and voltages to the LED and driver circuits not selected turn-off the remaining LEDs;
   measuring the light output intensity of the LEDs as a function of the series of different driver currents and voltages;
   storing a table for the selected LED and associated driver circuit representing the measured light output intensity as a function of the driver circuit currents and voltages; and
   repeating the providing, the measuring, and the storing for each of the plurality of LEDs and associated driver circuits.

7. The method of calibrating a horticultural light source of claim 6, wherein the providing, the measuring, the storing, and the repeating are performed periodically.

8. The method of calibrating a horticultural light source of claim 7, wherein periodically includes once per day, week, or month.

* * * * *